US012650734B2

(12) United States Patent     (10) Patent No.:   US 12,650,734 B2

Emami et al.     (45) Date of Patent:     Jun. 9, 2026

(54) SIMULTANEOUS CONTROLLER AND TOUCH INTERACTIONS

(71) Applicant: Meta Platforms Technologies, LLC, Menlo Park, CA (US)

(72) Inventors: Ali Emami, San Diego, CA (US); Aaron Selig, Watsonville, CA (US); Ahad Habib Basravi, Oakland, CA (US); James Michael-K O'Donnell, Pacifica, CA (US); Nathaniel Lane, Wrentham, MA (US); Todd Harris, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/404,111

(22) Filed: Jan. 4, 2024

(65) Prior Publication Data

US 2024/0281071 A1     Aug. 22, 2024

Related U.S. Application Data

(60) Provisional application No. 63/485,414, filed on Feb. 16, 2023.

(51) Int. Cl.
| | |
|---|---|
| *G06F 3/01* | (2006.01) |
| *G06F 3/0346* | (2013.01) |
| *G06V 40/20* | (2022.01) |

(52) U.S. Cl.
CPC ............ *G06F 3/017* (2013.01); *G06F 3/0346* (2013.01); *G06V 40/28* (2022.01)

(58) Field of Classification Search
CPC ........ G06F 3/017; G06F 3/0346; G06V 40/28
See application file for complete search history.

(56) References Cited

U.S. PATENT DOCUMENTS

| | | |
|---|---|---|
| 6,842,175 B1 | 1/2005 | Schmalstieg et al. |
| 7,701,439 B2 | 4/2010 | Hillis et al. |
| | (Continued) | |

FOREIGN PATENT DOCUMENTS

| | | |
|---|---|---|
| CN | 106716332 A | 5/2017 |
| CN | 108536273 A | 9/2018 |
| | (Continued) | |

OTHER PUBLICATIONS

Argelaguet F., et aL, A Survey of 3D Object Selection Techniques for Virtual Environments, Computers Graphics,2013, vol. 37, No. 3, pp. 121-136.

(Continued)

*Primary Examiner* — William Lu

(74) *Attorney, Agent, or Firm* — Potomac Law Group, PLLC; Dannon G. Allbee

(57) ABSTRACT

Aspects of the present disclosure are directed to artificial reality (XR) controllers and hand gestures and corresponding representation of the hand gestures in XR space. Users can benefit from being able to use touch interactions while also holding the XR controller. Example implementations allow a user to use controllers for distance interaction and interactions that require controller buttons, but also recognize when the user extends her finger and wants to manually touch things—using touch in conjunction with controllers. Thus, if the user has a controller in her hand and want to touch a UI element, she can also use her finger, where the system identifies the finger not touching the controller (e.g., via capacitance sensors) and that a hand pose is present (e.g., finger extended—from camera) to allow that finger to provide hand input, without the user having to put down the controller.

20 Claims, 14 Drawing Sheets

(56) References Cited

U.S. PATENT DOCUMENTS

| | | | | |
|---|---|---|---|---|
| 8,558,759 | B1 | 10/2013 | Prada Gomez et al. | |
| 8,836,768 | B1 | 9/2014 | Rafii et al. | |
| 8,947,351 | B1 | 2/2015 | Noble | |
| 9,117,274 | B2 | 8/2015 | Liao et al. | |
| 9,292,089 | B1 | 3/2016 | Sadek | |
| 9,406,277 | B1* | 8/2016 | Letourneur | G09G 5/10 |
| 9,477,303 | B2 | 10/2016 | Fleischmann et al. | |
| 9,477,368 | B1 | 10/2016 | Filip et al. | |
| 9,817,472 | B2 | 11/2017 | Lee et al. | |
| 10,042,430 | B2 | 8/2018 | Bedikian et al. | |
| 10,187,936 | B1* | 1/2019 | Letourneur | G09G 3/3406 |
| 10,220,303 | B1 | 3/2019 | Schmidt et al. | |
| 10,248,284 | B2 | 4/2019 | Itani et al. | |
| 10,318,100 | B2 | 6/2019 | Abercrombie et al. | |
| 10,473,935 | B1 | 11/2019 | Gribetz et al. | |
| 10,521,944 | B2 | 12/2019 | Sareen et al. | |
| 10,536,691 | B2* | 1/2020 | Valdivia | H04L 51/52 |
| 10,595,011 | B2 | 3/2020 | Han et al. | |
| 10,607,413 | B1 | 3/2020 | Marcolina et al. | |
| 10,691,233 | B2* | 6/2020 | Dalton | G06F 3/011 |
| 10,890,983 | B2 | 1/2021 | Ravasz et al. | |
| 10,956,724 | B1* | 3/2021 | Terrano | G06V 10/82 |
| 10,957,059 | B1* | 3/2021 | Katz | G06T 7/521 |
| 11,079,753 | B1 | 8/2021 | Roy | |
| 11,221,730 | B2 | 1/2022 | Murphy et al. | |
| 11,307,671 | B2* | 4/2022 | Liu | A63F 13/214 |
| 11,514,650 | B2 | 11/2022 | Kim et al. | |
| 11,991,222 | B1 | 5/2024 | Walton et al. | |
| 2004/0236541 | A1 | 11/2004 | Kramer et al. | |
| 2008/0089587 | A1 | 4/2008 | Kim et al. | |
| 2009/0077504 | A1 | 3/2009 | Bell et al. | |
| 2010/0306716 | A1 | 12/2010 | Perez | |
| 2011/0239155 | A1 | 9/2011 | Christie | |
| 2011/0267265 | A1 | 11/2011 | Stinson | |
| 2012/0069168 | A1 | 3/2012 | Huang et al. | |
| 2012/0071892 | A1 | 3/2012 | Itkowitz et al. | |
| 2012/0113223 | A1 | 5/2012 | Hilliges et al. | |
| 2012/0143358 | A1 | 6/2012 | Adams et al. | |
| 2012/0188279 | A1 | 7/2012 | Demaine | |
| 2012/0206345 | A1 | 8/2012 | Langridge | |
| 2012/0218183 | A1 | 8/2012 | Givon et al. | |
| 2012/0218395 | A1 | 8/2012 | Andersen et al. | |
| 2012/0249740 | A1 | 10/2012 | Lee et al. | |
| 2012/0249741 | A1 | 10/2012 | Maciocci et al. | |
| 2012/0275686 | A1 | 11/2012 | Wilson et al. | |
| 2012/0293544 | A1 | 11/2012 | Miyamoto et al. | |
| 2013/0063345 | A1 | 3/2013 | Maeda | |
| 2013/0125066 | A1 | 5/2013 | Klein et al. | |
| 2013/0147793 | A1 | 6/2013 | Jeon et al. | |
| 2013/0182902 | A1 | 7/2013 | Holz | |
| 2013/0265220 | A1 | 10/2013 | Fleischmann et al. | |
| 2014/0007484 | A1 | 1/2014 | Erdoss et al. | |
| 2014/0125598 | A1 | 5/2014 | Cheng et al. | |
| 2014/0204002 | A1 | 7/2014 | Bennet et al. | |
| 2014/0236996 | A1 | 8/2014 | Masuko et al. | |
| 2014/0306891 | A1 | 10/2014 | Latta et al. | |
| 2014/0357366 | A1 | 12/2014 | Koganezawa et al. | |
| 2014/0375691 | A1 | 12/2014 | Kasahara | |
| 2015/0035746 | A1 | 2/2015 | Cockburn et al. | |
| 2015/0040040 | A1 | 2/2015 | Balan et al. | |
| 2015/0054742 | A1 | 2/2015 | Imoto et al. | |
| 2015/0062160 | A1 | 3/2015 | Sakamoto et al. | |
| 2015/0110285 | A1 | 4/2015 | Censo et al. | |
| 2015/0153833 | A1 | 6/2015 | Pinault et al. | |
| 2015/0160736 | A1 | 6/2015 | Fujiwara | |
| 2015/0169076 | A1 | 6/2015 | Cohen et al. | |
| 2015/0178985 | A1 | 6/2015 | Di Censo et al. | |
| 2015/0181679 | A1 | 6/2015 | Liao et al. | |
| 2015/0206321 | A1 | 7/2015 | Scavezze et al. | |
| 2015/0220150 | A1 | 8/2015 | Plagemann et al. | |
| 2015/0243100 | A1 | 8/2015 | Abovitz et al. | |
| 2015/0261659 | A1 | 9/2015 | Bader et al. | |
| 2015/0269783 | A1 | 9/2015 | Yun | |
| 2016/0110052 | A1 | 4/2016 | Kim et al. | |
| 2016/0147308 | A1 | 5/2016 | Gelman et al. | |
| 2016/0170603 | A1 | 6/2016 | Bastien et al. | |
| 2016/0217614 | A1 | 7/2016 | Kraver et al. | |
| 2016/0378291 | A1 | 12/2016 | Pokrzywka | |
| 2017/0050542 | A1 | 2/2017 | Shigeta et al. | |
| 2017/0060230 | A1 | 3/2017 | Faaborg et al. | |
| 2017/0109936 | A1 | 4/2017 | Powderly et al. | |
| 2017/0139478 | A1 | 5/2017 | Jeon et al. | |
| 2017/0139481 | A1* | 5/2017 | Long | G06F 3/0346 |
| 2017/0192513 | A1 | 7/2017 | Karmon et al. | |
| 2017/0206691 | A1* | 7/2017 | Harrises | G02B 27/0172 |
| 2017/0228130 | A1 | 8/2017 | Palmaro | |
| 2017/0262063 | A1 | 9/2017 | Blénessy et al. | |
| 2017/0263033 | A1* | 9/2017 | Church | G06F 3/04815 |
| 2017/0278304 | A1 | 9/2017 | Hildreth et al. | |
| 2017/0287225 | A1 | 10/2017 | Powderly et al. | |
| 2017/0296363 | A1 | 10/2017 | Yetkin et al. | |
| 2017/0308166 | A1* | 10/2017 | Mallinson | A63F 13/212 |
| 2017/0329515 | A1* | 11/2017 | Clement | G06F 3/011 |
| 2017/0337742 | A1 | 11/2017 | Powderly et al. | |
| 2017/0364198 | A1 | 12/2017 | Yoganandan et al. | |
| 2018/0004283 | A1 | 1/2018 | Mathey-Owens et al. | |
| 2018/0033204 | A1* | 2/2018 | Dimitrov | G06T 15/20 |
| 2018/0039341 | A1* | 2/2018 | Du Bois | G06F 3/017 |
| 2018/0046245 | A1 | 2/2018 | Schwarz et al. | |
| 2018/0059901 | A1 | 3/2018 | Gullicksen | |
| 2018/0107278 | A1 | 4/2018 | Goel et al. | |
| 2018/0113599 | A1 | 4/2018 | Yin | |
| 2018/0157398 | A1* | 6/2018 | Kaehler | G06T 19/006 |
| 2018/0188816 | A1* | 7/2018 | Liu | A63F 13/42 |
| 2018/0303446 | A1 | 10/2018 | Schweizer | |
| 2018/0307303 | A1 | 10/2018 | Powderly et al. | |
| 2018/0322701 | A1* | 11/2018 | Pahud | G06F 3/038 |
| 2018/0323992 | A1 | 11/2018 | Harms et al. | |
| 2018/0329492 | A1 | 11/2018 | Coppin et al. | |
| 2018/0335925 | A1 | 11/2018 | Hsiao et al. | |
| 2018/0357780 | A1 | 12/2018 | Young et al. | |
| 2019/0018498 | A1 | 1/2019 | West et al. | |
| 2019/0050071 | A1 | 2/2019 | Liu et al. | |
| 2019/0057531 | A1 | 2/2019 | Sareen et al. | |
| 2019/0094981 | A1 | 3/2019 | Bradski et al. | |
| 2019/0107894 | A1 | 4/2019 | Hebbalaguppe et al. | |
| 2019/0120593 | A1 | 4/2019 | Randles | |
| 2019/0129607 | A1 | 5/2019 | Saurabh et al. | |
| 2019/0130653 | A1 | 5/2019 | Kuehne | |
| 2019/0138107 | A1* | 5/2019 | Nietfeld | A63F 13/428 |
| 2019/0146599 | A1* | 5/2019 | Gunnarsson | G06F 3/0346 |
| | | | | 345/156 |
| 2019/0213792 | A1 | 7/2019 | Jakubzak et al. | |
| 2019/0258318 | A1 | 8/2019 | Qin et al. | |
| 2019/0265828 | A1 | 8/2019 | Hauenstein et al. | |
| 2019/0278376 | A1 | 9/2019 | Kutliroff et al. | |
| 2019/0279424 | A1 | 9/2019 | Clausen et al. | |
| 2019/0286231 | A1 | 9/2019 | Burns et al. | |
| 2019/0290999 | A1* | 9/2019 | Bradner | A63F 13/428 |
| 2019/0318640 | A1* | 10/2019 | Goel | A61B 90/36 |
| 2019/0325651 | A1* | 10/2019 | Bradner | G06F 3/011 |
| 2019/0347865 | A1 | 11/2019 | Hackett et al. | |
| 2019/0361521 | A1 | 11/2019 | Stellmach et al. | |
| 2019/0362562 | A1 | 11/2019 | Benson | |
| 2019/0369391 | A1 | 12/2019 | Cordesses et al. | |
| 2019/0377416 | A1* | 12/2019 | Alexander | G06F 3/04815 |
| 2019/0391710 | A1 | 12/2019 | Shen | |
| 2020/0001172 | A1* | 1/2020 | Nicoli | G06F 3/012 |
| 2020/0012341 | A1 | 1/2020 | Stellmach et al. | |
| 2020/0082629 | A1 | 3/2020 | Jones et al. | |
| 2020/0097077 | A1 | 3/2020 | Nguyen et al. | |
| 2020/0097091 | A1 | 3/2020 | Chou et al. | |
| 2020/0129850 | A1 | 4/2020 | Ohashi | |
| 2020/0159337 | A1* | 5/2020 | Kin | G06F 3/017 |
| 2020/0218423 | A1 | 7/2020 | Ohashi | |
| 2020/0225736 | A1 | 7/2020 | Schwarz et al. | |
| 2020/0225757 | A1* | 7/2020 | Schwarz | G06F 3/017 |
| 2020/0225758 | A1 | 7/2020 | Tang et al. | |
| 2020/0225813 | A1 | 7/2020 | Schwarz et al. | |
| 2020/0225830 | A1 | 7/2020 | Tang et al. | |
| 2020/0226814 | A1 | 7/2020 | Tang et al. | |
| 2020/0379576 | A1 | 12/2020 | Chen et al. | |
| 2020/0388228 | A1 | 12/2020 | Ravasz et al. | |
| 2020/0387287 | A1 | 12/2020 | Ravasz et al. | |

(56) References Cited

U.S. PATENT DOCUMENTS

| 2020/0388247 A1 | 12/2020 | Ravasz et al. | |
| 2021/0076091 A1 | 3/2021 | Shohara | |
| 2021/0096726 A1 | 4/2021 | Faulkner et al. | |
| 2021/0134065 A1* | 5/2021 | Ramani | G06F 3/0346 |
| 2021/0141461 A1* | 5/2021 | Liu | A63F 13/245 |
| 2021/0183135 A1* | 6/2021 | Lin | G06T 15/04 |
| 2021/0208698 A1* | 7/2021 | Martin | G06F 3/012 |
| 2021/0373672 A1 | 12/2021 | Schwarz et al. | |
| 2022/0084279 A1 | 3/2022 | Lindmeier et al. | |
| 2022/0121344 A1* | 4/2022 | Pastrana Vicente | G06F 3/0484 |
| 2022/0163800 A1* | 5/2022 | Yokokawa | G06N 3/08 |
| 2022/0198755 A1* | 6/2022 | Pinchon | G06T 19/003 |
| 2022/0262080 A1 | 8/2022 | Burton et al. | |
| 2023/0031913 A1* | 2/2023 | Ishikawa | G06F 3/0481 |
| 2023/0040610 A1 | 2/2023 | Buerli et al. | |
| 2023/0072423 A1 | 3/2023 | Osborn et al. | |
| 2023/0274512 A1 | 8/2023 | Terre et al. | |
| 2023/0343052 A1* | 10/2023 | Kimura | G06T 19/20 |
| 2024/0019938 A1* | 1/2024 | Whitmire | G06F 3/016 |
| 2024/0028129 A1* | 1/2024 | Whitmire | G06F 1/163 |
| 2024/0264660 A1 | 8/2024 | Levatich et al. | |
| 2024/0265656 A1 | 8/2024 | Mctor-Faichney et al. | |
| 2024/0281070 A1 | 8/2024 | Emami et al. | |
| 2024/0372901 A1 | 11/2024 | Walton et al. | |

FOREIGN PATENT DOCUMENTS

| EP | 3155560 A1 | 4/2017 |
| EP | 3155560 B1 | 5/2020 |
| EP | 4145397 A1 | 3/2023 |
| JP | 2015100032 A | 5/2015 |
| JP | 2015176439 A | 10/2015 |
| JP | 2015192436 A | 11/2015 |
| JP | 2017529635 A | 10/2017 |
| KR | 20120136719 A | 12/2012 |
| WO | 2014119258 A1 | 8/2014 |
| WO | 2015192117 A1 | 12/2015 |
| WO | 2017009707 A1 | 1/2017 |
| WO | 2018067508 A1 | 4/2018 |
| WO | 2018235371 A1 | 12/2018 |
| WO | 2019245681 A1 | 12/2019 |
| WO | 2022146938 A1 | 7/2022 |

OTHER PUBLICATIONS

Cardoso J., 'Comparison of Gesture, Gamepad, and Gaze-Based Locomotion for VR Worlds, Proceedings of the 22nd ACM Conference on Virtual Reality Software and Technology, Nov. 2, 2016, pp. 319-320.

Fox B., et al., "Designing Singlehanded Shortcuts for VR AR," May 10, 2018, Retrieved from the Internet: URL: https://www.roadtovr.com/leap-motion-designing-single-handed-shortcuts-for-vr-ar/, [Retrieved on Oct. 27, 2020], 18 pages.

Hincapie-Ramos J.D., et aL, "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/051763, mailed Mar. 31, 2022, 10 pages.

International Search Report and Written Opinion for International Application No. PCT/US2020/051763, mailed Feb. 3, 2021, 11 Pages.

International Search Report and Written Opinion for International Application No. PCT/US2021/063536 mailed Mar. 22, 2022, 12 pages.

International Search Report and Written Opinion for International Application No. PCT/US2023/017990, mailed Jul. 10, 2023, 9 pages.

International Search Report and Written Opinion of International Application No. PCT/US2020/035998, mailed Sep. 30, 2020, 16 pages.

Lang B., "Leap Motion Virtual Wearable AR Prototype is a Potent Glimpse at the Future of Your Smartphone," Mar. 24, 2018, Retrieved from the Internet: URL: https://www.roadtovr.com/leap-motion-virtual-wearable-ar-prototype-glimpse-of-future-smartphone/, [Retrieved on Oct. 27, 2020], 6 pages.

Lee M.S., et al., "A Computer Vision System for on-Screen Item Selection by Finger Pointing," in Proceedings of the 2001 IEEE Computer Society Conference on Computer Vision and Pattern Recognition (CVPR), 2001, vol. 1, 8 pages.

Mardanbegi D., et al., "Eyesee Through: Unifying Tool Selection and Application in Virtual Environments," In 2019 IEEE Conference on Virtual Reality and 3D User Interfaces (VR), 2019, pp. 474-483.

Matsuda K., "Augmented City 3D [Official]," YouTube, Aug. 20, 2010, Retrieved from the Internet: URL: https://www.youtube.com/watch?v=3TL80ScTLIM, 1 page.

Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Mine M.R., et al., Moving Objects in Space: Exploiting Proprioception in Virtual-Environment Interaction, in Proceedings of the 24th Annual Conference on Computer Graphics and Interactive Techniques, 1997, pp. 19-26.

Newton A., "Immersive Menus Demo," YouTube, Oct. 8, 2017, Retrieved from the Internet: URL: https://www.youtube.com/watch?v=_ow1RboHJDY, 1 page.

Office Action mailed Sep. 19, 2023 for European Patent Application No. 20747255.6, filed on Dec. 7, 2021, 6 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Pfeiffer, et al., "Gaze+ Pinch Interaction in Virtual Reality," Proceedings of the 5th Symposium on Spatial User Interaction, SUI '17, Oct. 16, 2017, pp. 99-108.

Prosecution History of U.S. Appl. No. 16/434,919, dated Apr. 2, 2020 through Dec. 15, 2020, 46 pages.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

Tomberlin M., et al., "Gauntlet: Travel Technique for Immersive Environments using Non-Dominant Hand," IEEE Virtual Reality (VR), Mar. 18, 2017, pp. 299-300.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Huang, et al., Evaluation of a Hybrid of Hand Gesture and Controller Inputs in Virtual Reality, published online on Aug. 26, 2020, International Journal of Human-Computer Interaction, 37:2, 169-180, DOI: 10.1080/10447318.2020.1809248.

European Search Report for European Patent Application No. 24154976.5, dated Jun. 7, 2024, 8 pages.

European Search Report for European Patent Application No. 24155225.6, dated May 2, 2024, 10 pages.

Office Action mailed Apr. 9, 2024 for Japanese Patent Application No. 2021-555497, filed on Jun. 3, 2020, 4 pages.

Office Action mailed Feb. 27, 2024 for Chinese Application No. 202080035337.X, filed Jun. 3, 2020, 8 pages.

* cited by examiner

100

101
102
103

800

801

806

Cap Sense

Cap Sense
Pressed

Pressed direct touch
interface out of
range

AND

SIMULTANEOUS CONTROLLER AND TOUCH INTERACTIONS

CROSS-REFERENCE TO RELATED APPLICATIONS

This application claims priority to U.S. Provisional Patent Application No. 63/485,414, titled "Simultaneous Controller and Touch Interactions," filed Feb. 16, 2023, this application is also related to U.S. patent application Ser. No. 18/310,622, titled "Simultaneous Controller and Touch Interactions," filed May 2, 2023, each of which are herein incorporated by reference in their entirety.

TECHNICAL FIELD

The present disclosure is directed to artificial reality (XR) controllers and hand gestures and corresponding representation of the hand gestures in XR space.

BACKGROUND

Artificial reality (XR) devices are becoming more prevalent. As they become more popular, the applications implemented on such devices are becoming more sophisticated. Augmented reality (AR) applications can provide interactive 3D experiences that combine images of the real-world with virtual objects, while virtual reality (VR) applications can provide an entirely self-contained 3D computer environment. For example, an AR application can be used to superimpose virtual objects over a video feed of a real scene that is observed by a camera. A real-world user in the scene can then make gestures captured by the camera that can provide interactivity between the real-world user and the virtual objects. Mixed reality (MR) systems can allow light to enter a user's eye that is partially generated by a computing system and partially includes light reflected off objects in the real-world. AR, MR, and VR (together XR) experiences can be observed by a user through a head-mounted display (HMD), such as glasses or a headset.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
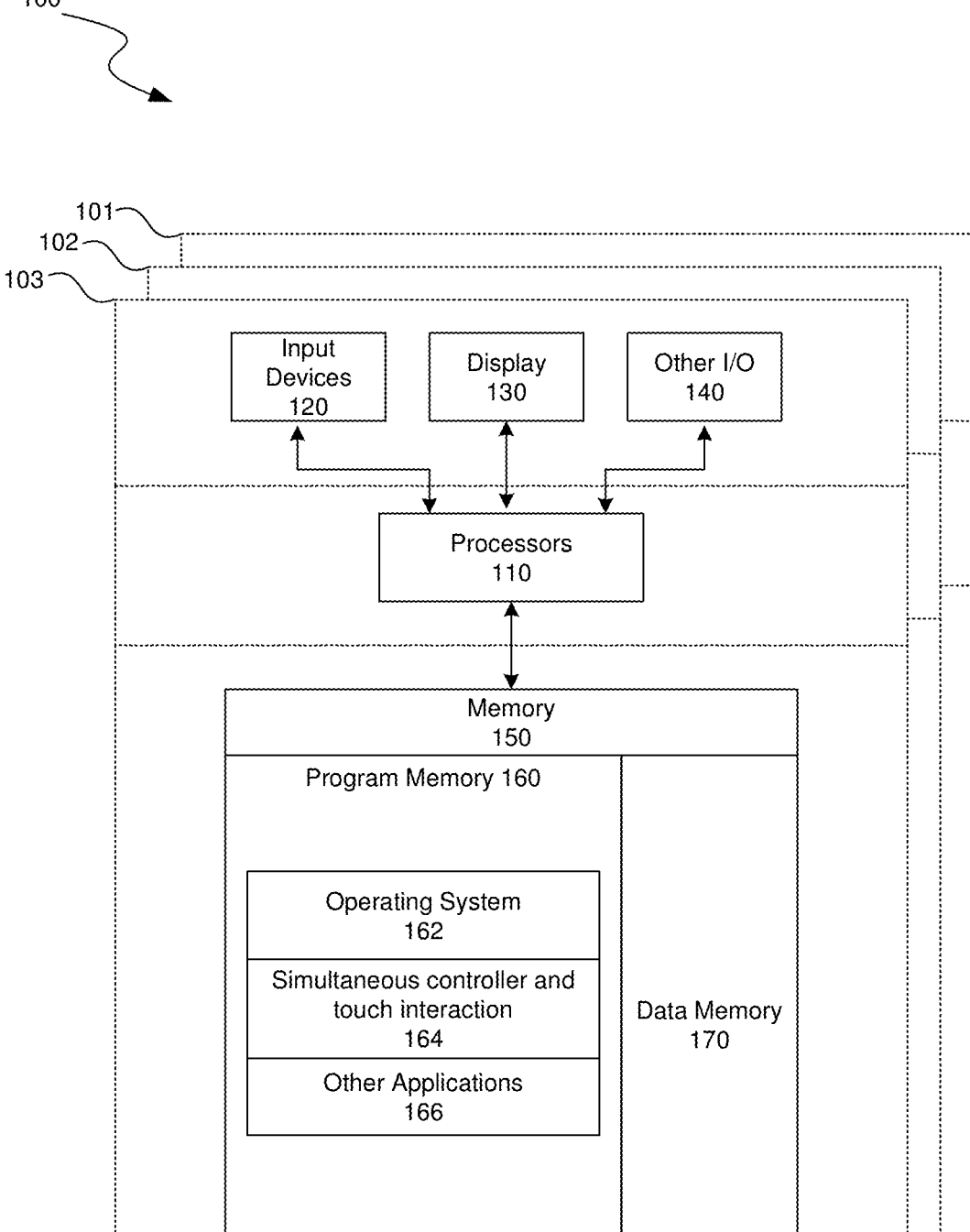
FIG. 1 is a block diagram illustrating an overview of devices on which some implementations of the present technology can operate.

Aspects of the present disclosure are directed to a multi-modal input system for both artificial reality (XR) controllers and hand gestures and corresponding representation of the hand gestures in XR space, allowing for simultaneous controller and hand interactions in the artificial reality environment. Implementations allow a user to use controllers for distance interaction and interactions that require controller buttons, but also recognize when the user makes a gestures, such as extending her finger, indicating she wants to manually touch things—using touch interactions in conjunction with controllers. Thus, if the user has a controller in her hand and want to touch a UI element, she can also use one or more fingers, where the system identifies the finger not touching the controller (e.g., via camera and/or capacitance sensors) and that a hand pose is present (e.g., finger extended—e.g., by the artificial reality device's camera) to allow that finger to provide hand input, without the user having to put down the controller.

For example, a user may be wearing a head-mounted display (HMD) which presents various virtual objects in the artificial reality environment, such as a virtual tablet directly in front of the user and a virtual whiteboard several meters away from the user. The user can interact with the virtual tablet by extending her finger off a controller device she is using, which is recognized by the artificial reality device. A representation of the user's hand with her finger extended can be shown in the artificial reality environment. The user can then move her hand to have her finger collide with parts of the virtual tablet to interact with it, while still holding the controller. Also, the user can point a ray cast out from the controller at the virtual whiteboard to draw on it, all the while retaining the option to manually interact with the virtual tablet without having to ever put down or pick up the controller.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

The disclosed system provides various benefits over existing systems that provide either input via a controller or require the user to disengage with the controller to perform direct hand interactions. In particular, by providing automatic sensing of user hand interactions and posture in relation to a held physical controller, where certain postures and interactions are mapped to different input mods in an artificial reality environment, the multi-modal input system provides for inputs not possible with existing systems and also improves efficiency in interpreting user interactions. These benefits are realized through the hardware and software configurations of the multi-modal input system with systems such as controller capacitance sensing and computer vision modules, along with specialized mappings of sensed hand and controller interactions to input interpretation, thus these benefits are realized in an area of artificial reality and computer interactions.

Several implementations are discussed below in more detail in reference to the figures. FIG. 1 is a block diagram illustrating an overview of devices on which some implementations of the disclosed technology can operate. The devices can comprise hardware components of a computing system 100 that provide simultaneous controller and touch interactions. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, simultaneous controller and touch interaction (multi-modal input) system 164, and other application programs 166. Memory 150 can also include data memory 170 that can include, e.g., data used to determine hand gestures, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
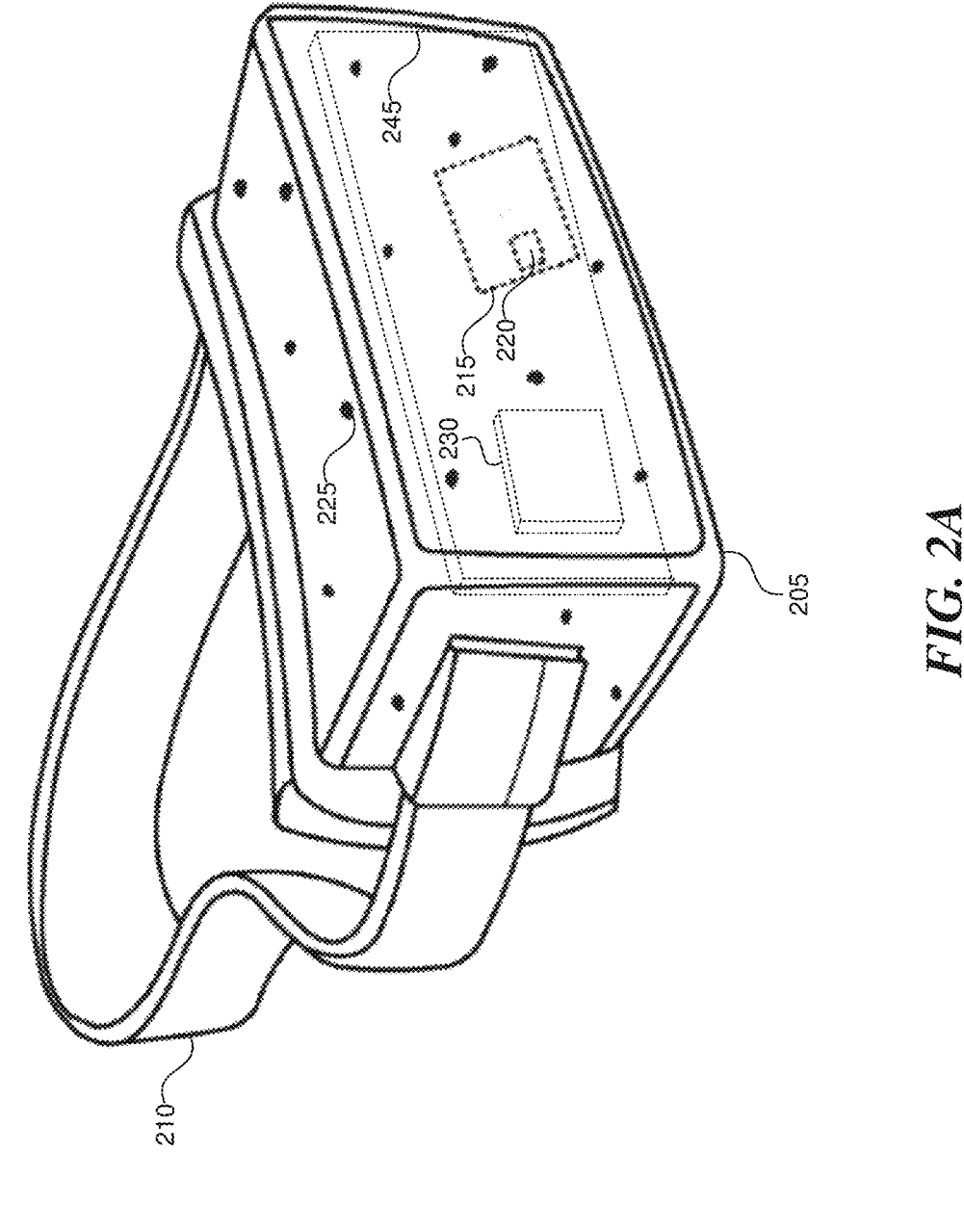
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
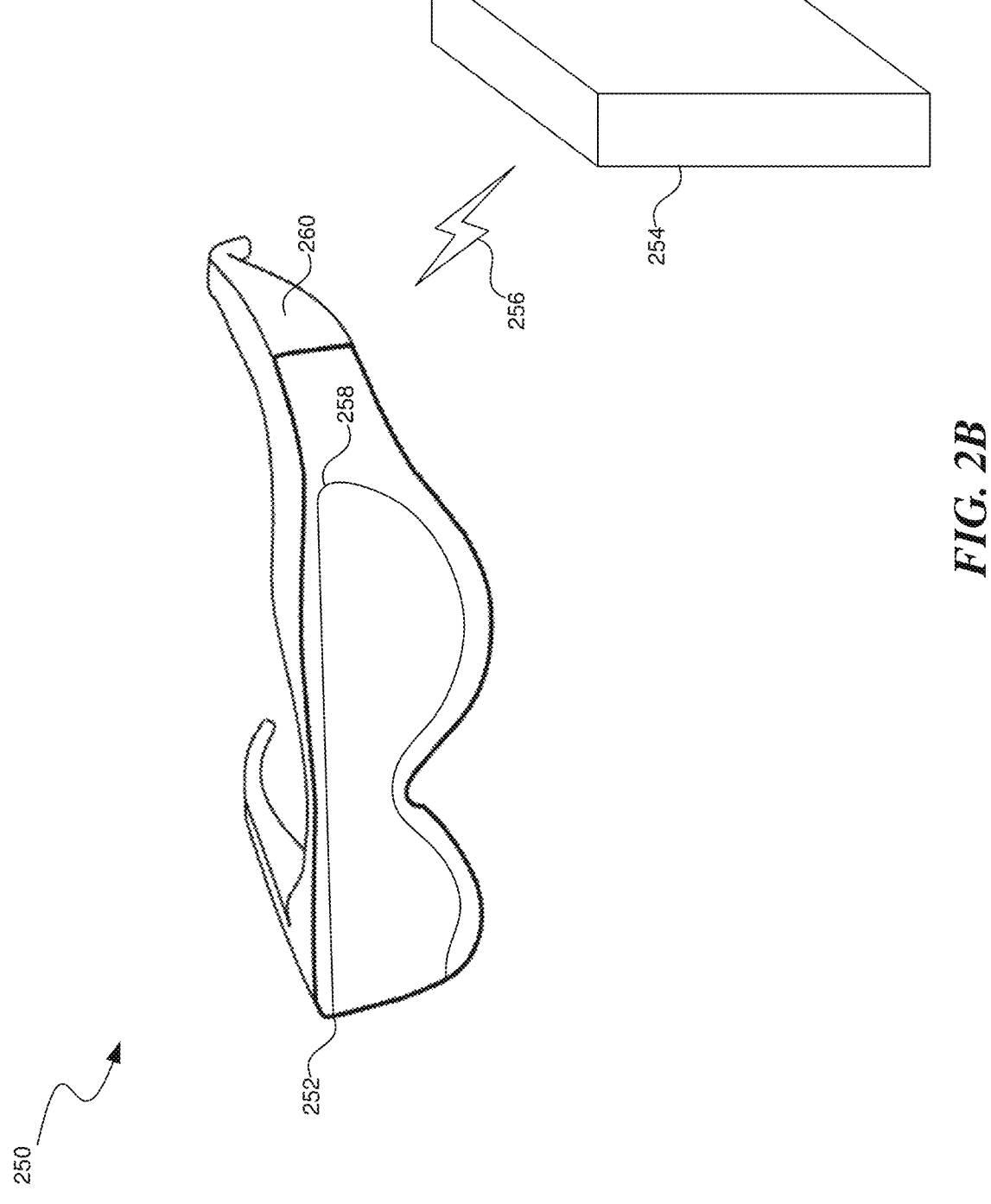
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
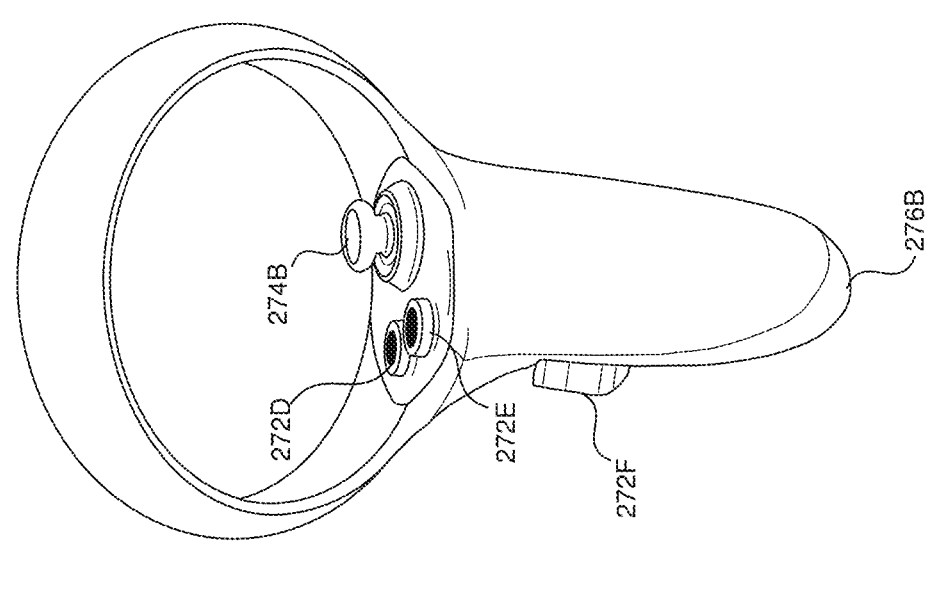
FIG. 2C is a wire diagram illustrating controllers which, in some implementations, a user can hold in one or both hands to interact with an artificial reality environment.
Figure 2C:
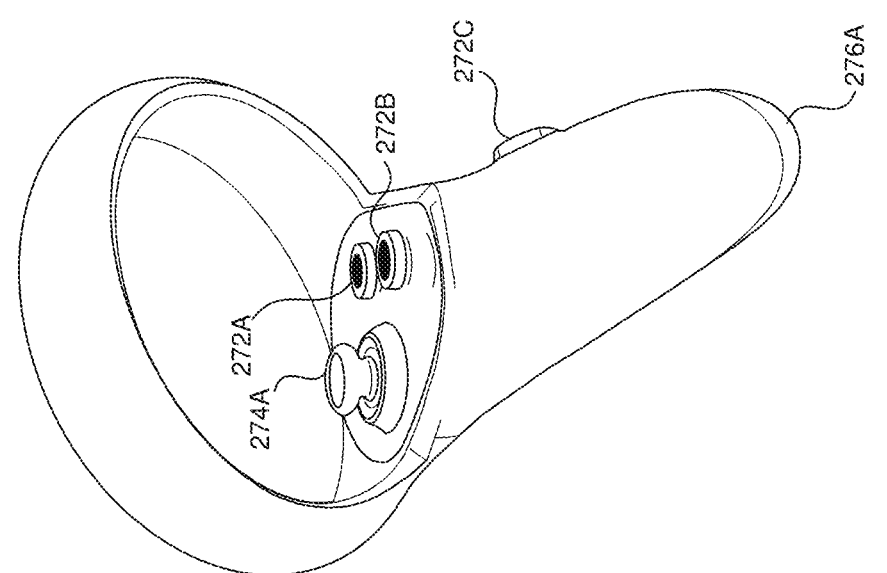
Figure 2C:
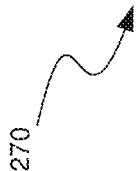

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
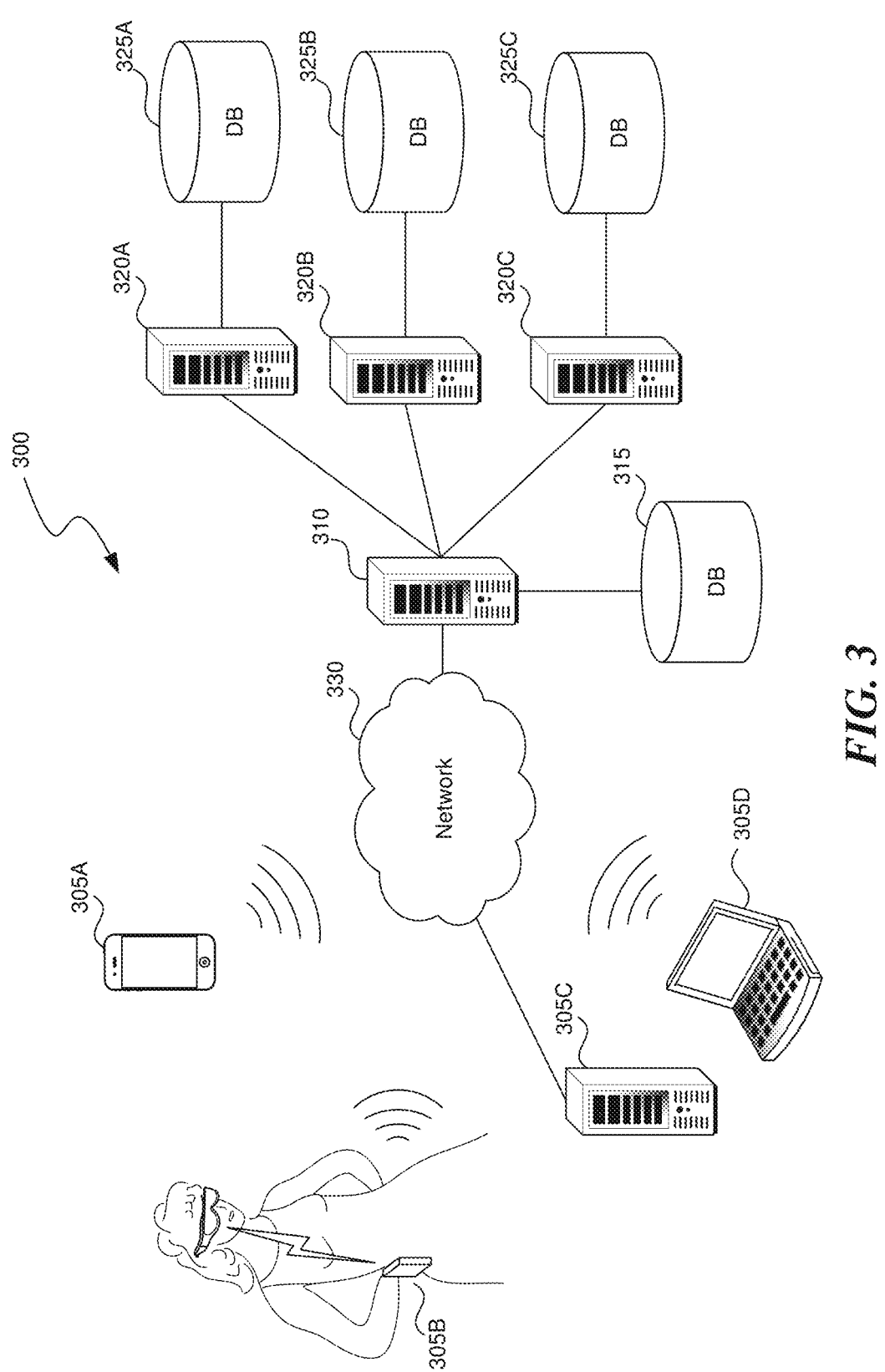
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
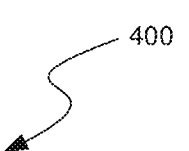
FIG. 4 is a block diagram illustrating components which, in some implementations, can be used in a system employing the disclosed technology.
Figure 4:
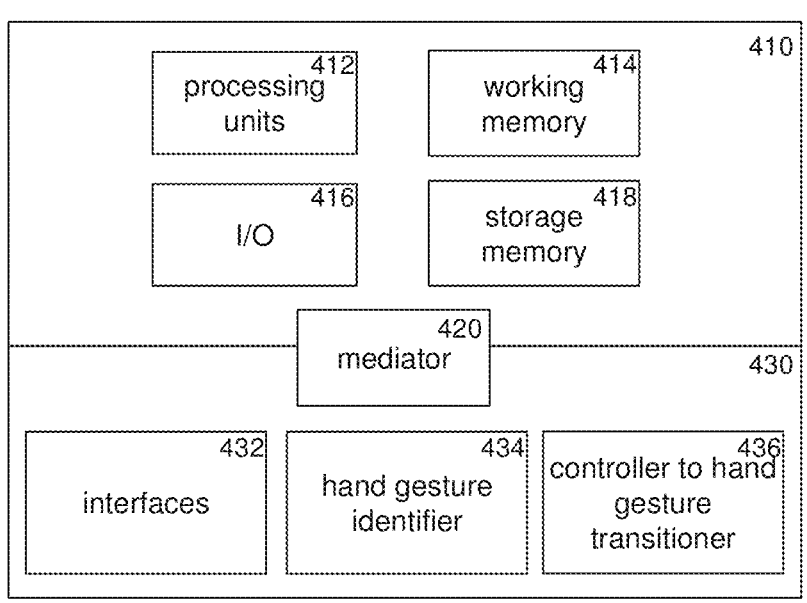

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for simultaneous controller and touch interactions. Specialized components 430 can include hand gesture identifier 434 and controller to hand gesture transitioner 436, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Those skilled in the art will appreciate that the components illustrated in FIGS. 1-4 described above, and in each of the diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5A:
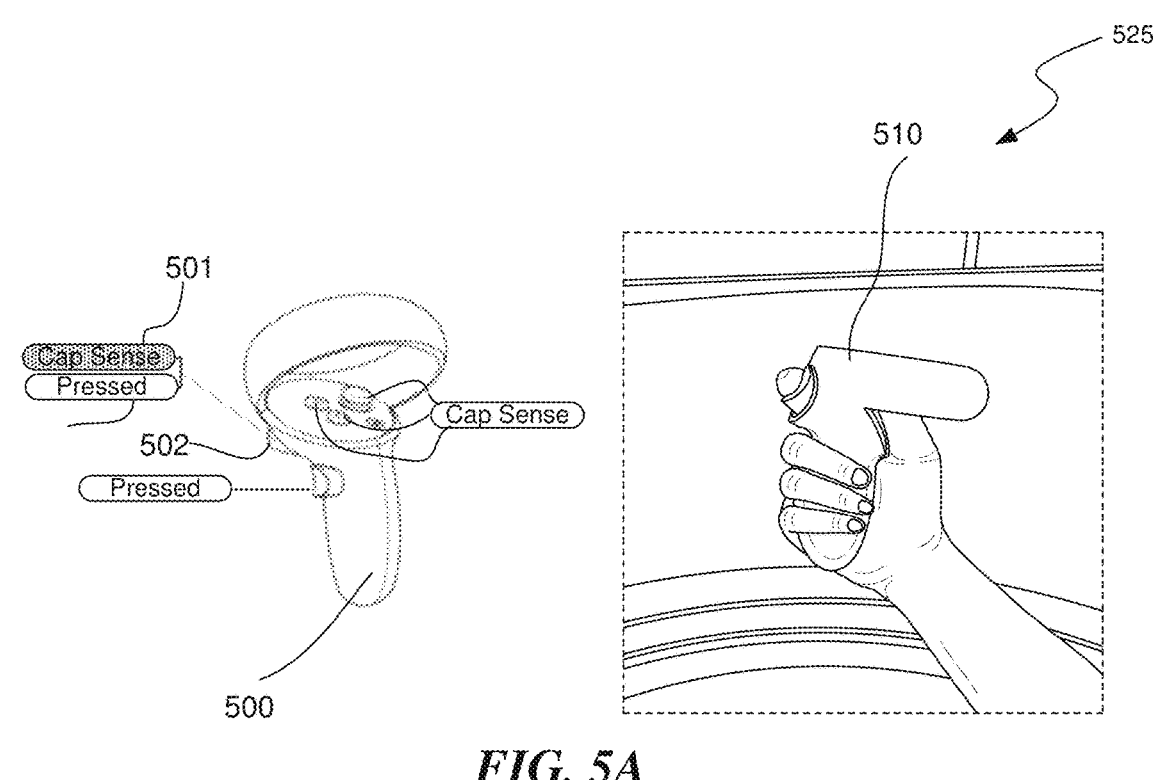
FIGS. 5A and 5B are conceptual diagrams illustrating an example of hand gestures in connection with a controller.
Figure 5B:
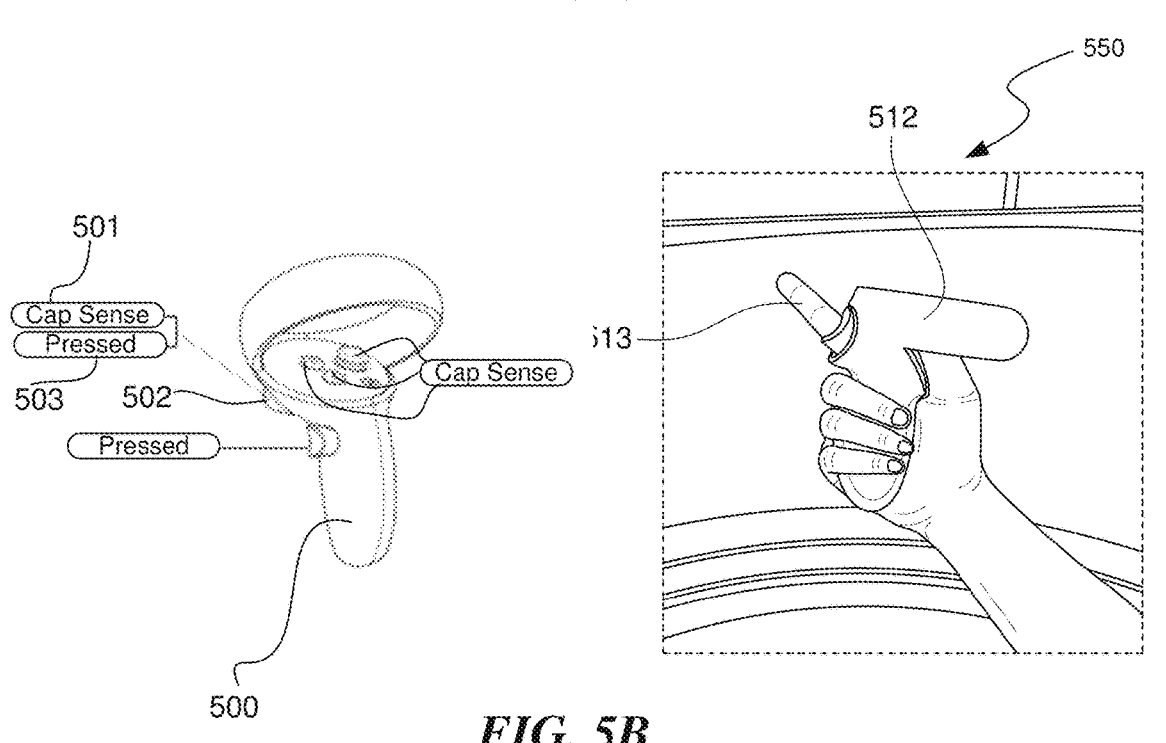

FIGS. 5A and 5B illustrate two hand gestures in connection with a controller. FIG. 5A illustrates an example 525 where a controller 500 is intended to be gripped by a user's hand. In general, the user's index finger will be contacting button 502 when controller 500 is fully gripped. A capacitance sensor, pressure sensor, IR sensor, computer vision analysis of an image of the user's hand in relation to the button 502, or other means can determine that the user's index finger is contacting button 502. The system detecting that the user's finger is touching button 502 is indicated by the shaded "cap sense" state 501, where the button 502 can have states not being touched (e.g., no cap sense and not pressed, capacitance sensed 501, or button pressed 503). In examples, the avatar representation on the UI, when controller 500 is fully gripped and the user's index finger is contacting button 502, is shown at 510 as having the representation of the user's hand (e.g., a hand of the user's avatar) curled around touching a representation of button 502 on a representation of controller 500.

FIG. 5B illustrates an example 550 where controller 500 is gripped by the user where the user has extended their index finger, e.g., with the intent of initiating a pointing gesture. The capacitive sensor in button 502 detects that the index finger is no longer contacting button 502 (e.g., as shown by the cap sense state 501 being not highlighted). In examples, the avatar representation on the UI, when the user's index finger is no longer contacting button 502, is shown at 512 as having the representation of the user's hand (e.g., a hand of the user's avatar) pointed out away from the representation of controller 500. In some cases, the direction the avatar finger is pointed can be a default amount (e.g., the finger always points out at a particular angle when the user is not touching button 502) or can be based on the actual position of the user's finger, as tracked by one or more cameras of the artificial reality system that capture images of the user hand, by a wearable such as a wristband of the artificial reality system that can detect hand position (e.g., using electric pulses reflected through an internal part state of the hand/wrist which a machine learning model can be trained to translate into a hand/finger pose), a pose-sensing glove or ring, or other pose detecting mechanism. In some implementations, the controller is not represented in the artificial reality environment, and the avatar hand alone is shown in a curled (510) pose or with a finger pointed (512) position (e.g., as discussed below in relation to FIG. 6).

Figure 6:
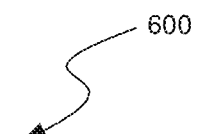
FIG. 6 is a conceptual diagram illustrating an example of an user hand, illustrated in a VR environment, directly interacting with content while the user holds a real-world controller.
Figure 6:
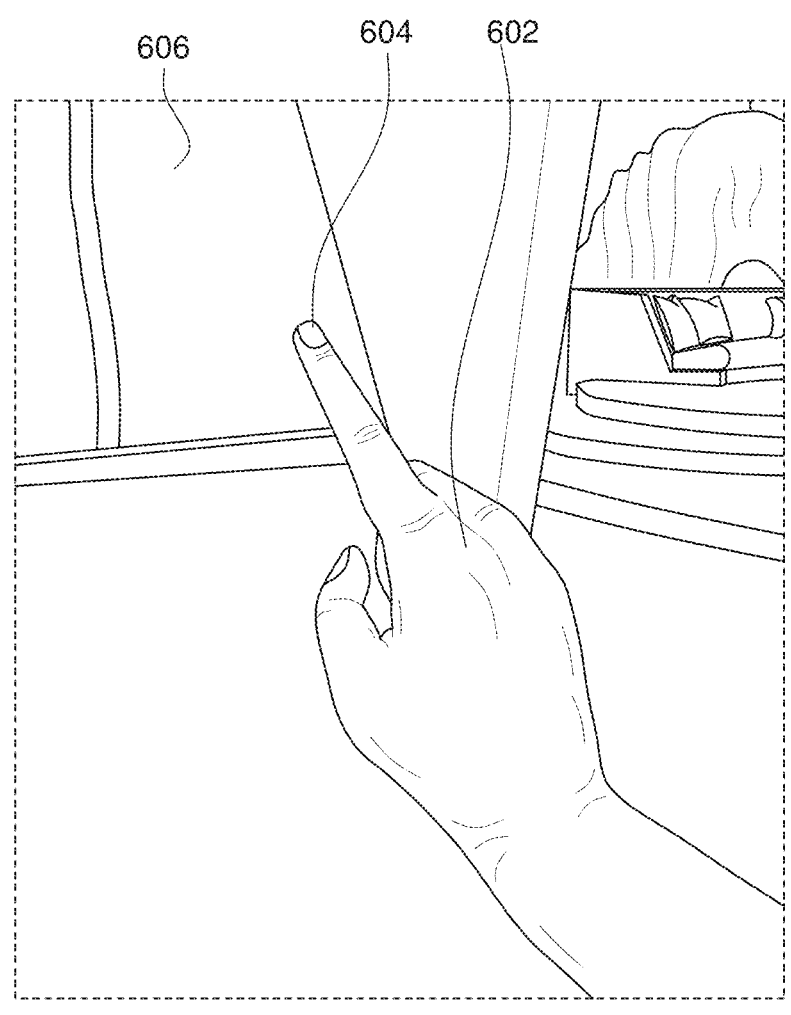

FIG. 6 illustrates an example 600 with a pure hand avatar (without the controller that the user is holding being rendered) shown based on the multi-modal input system determining that the user is making a gesture of the index finger being removed from the controller button (e.g., using a capacitance sensor, pressure sensor, IR sensor, computer vision analysis of an image of the user's hand, etc.). In example 600, the representation of the user's hand 602, illustrates the finger 604 extended so that it can be used for pointing and selecting. For example, UI 606 is displayed with selectable button 608. When the user moves her hand, it's position is tracked (e.g., using a position of the controller the user is holding or using computer vision systems to determine a location of the user's hand) and used to update the location of the user's hand 602 (with corresponding finger representation 604) in the artificial reality environment. When the finger representation 604 contacts the button 608, it can be "pressed," all without the user having to ever put down a controller she is holding.

Figure 7A:
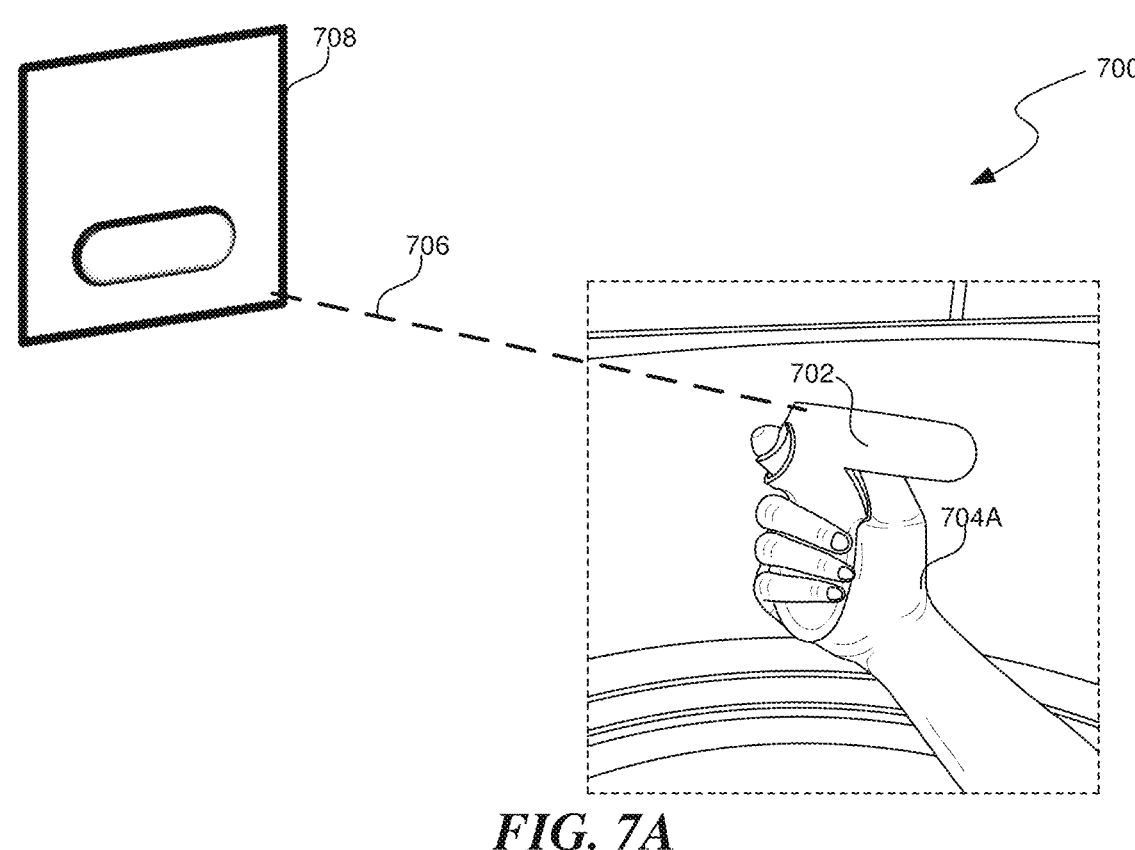
FIGS. 7A and 7B are conceptual diagrams illustrating an example transition between an avatar showing both a controller and hand to a pure hand view without the controller.
Figure 7B:
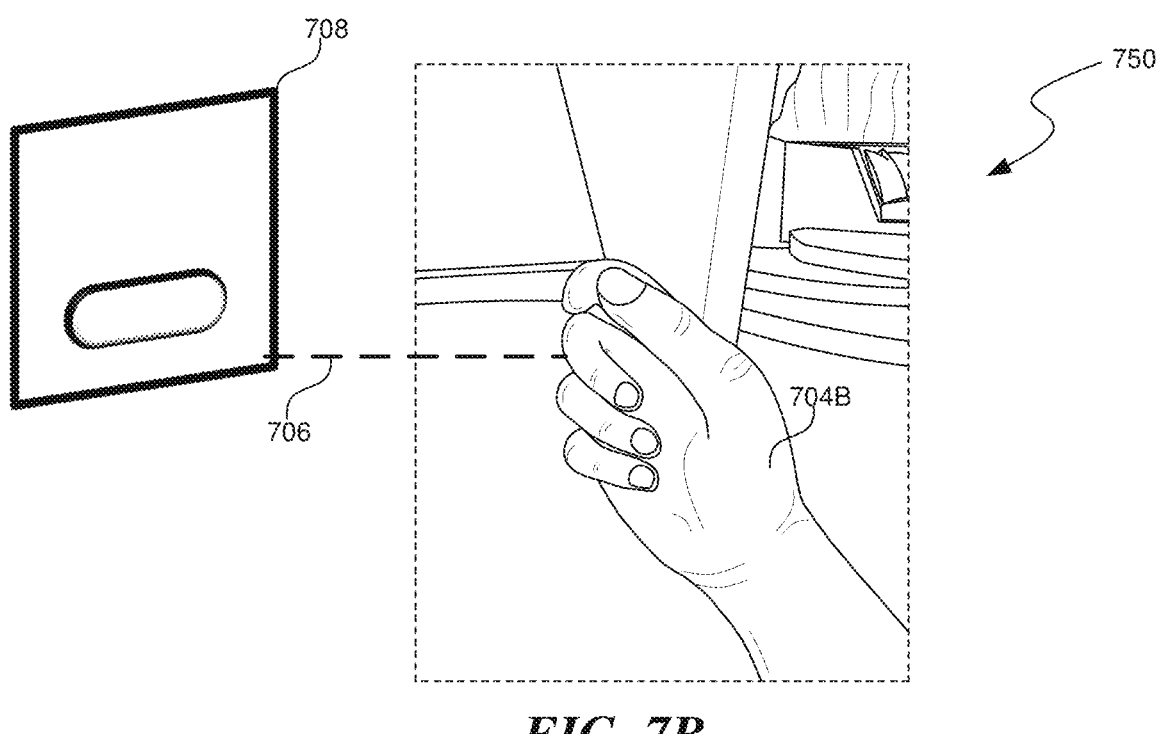

FIGS. 7A and 7B illustrates examples 700 and 750 that transition between the avatar showing both the controller and hand (FIG. 7A—700) and then, as the controller gets closer to the UI, the pure hand without the controller (FIG. 7B—750). In some implementations, when a user is holding a controller, a representation 702 of the controller can be drawn in the artificial reality environment, being held by a representation 704A of the user's hand. However, in some cases, to ease direct touch interactions, the representation 702 of the controller can be hidden in certain circumstances. In the example 700 and 750, when the distance, illustrated by dashed line 706, between the representation 704A of the user's hand and the UI 708 (configured for direct touch interaction) is above a threshold distance, as in example 700, the representation 702 of the controller is shown. When the distance 706 between the representation 704B of the user's hand and the UI 708 is below the threshold distance, as in example 750, the representation 702 of the controller is not shown. In some cases, a further condition for hiding the representation 702 of the controller is when the multi-modal input system detects that the user has also made a particular gesture, such as extending her finger.

FIGS. 8A-D illustrate examples 800, 820, 840, and 860 of various poses, applied to an avatar hand in an artificial reality environment, based on how the user's hand is contacting the controller.

Figure 8A:
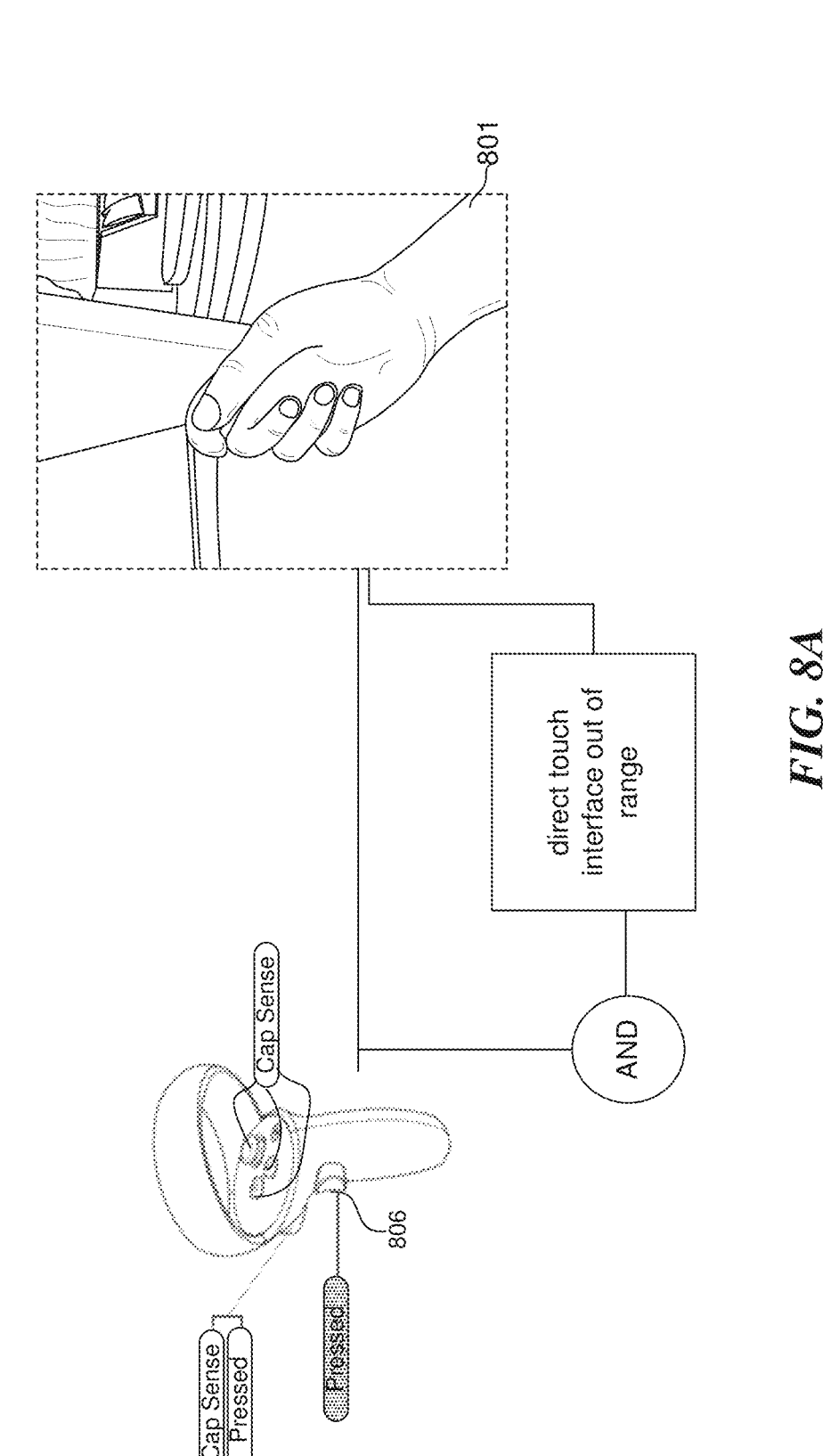
FIGS. 8A-D illustrate examples of various poses, applied to an avatar hand in an artificial reality environment, based on how the user's hand is contacting the controller.

In example 800 of FIG. 8A, hand representation 801 is in a neutral pose, in response to a grip button 806 being pressed (as shown by the grip button 806 having a shaded "pressed" status—e.g., when the user's middle finger is pressing the grip button 806), along with the user's hand being out of range (a threshold distance away) from any element configured for direct touch interactions. In each of examples 820, 840, and 860, the user's hand is within a range of an element configured for direct touch interaction.

Figure 8B:
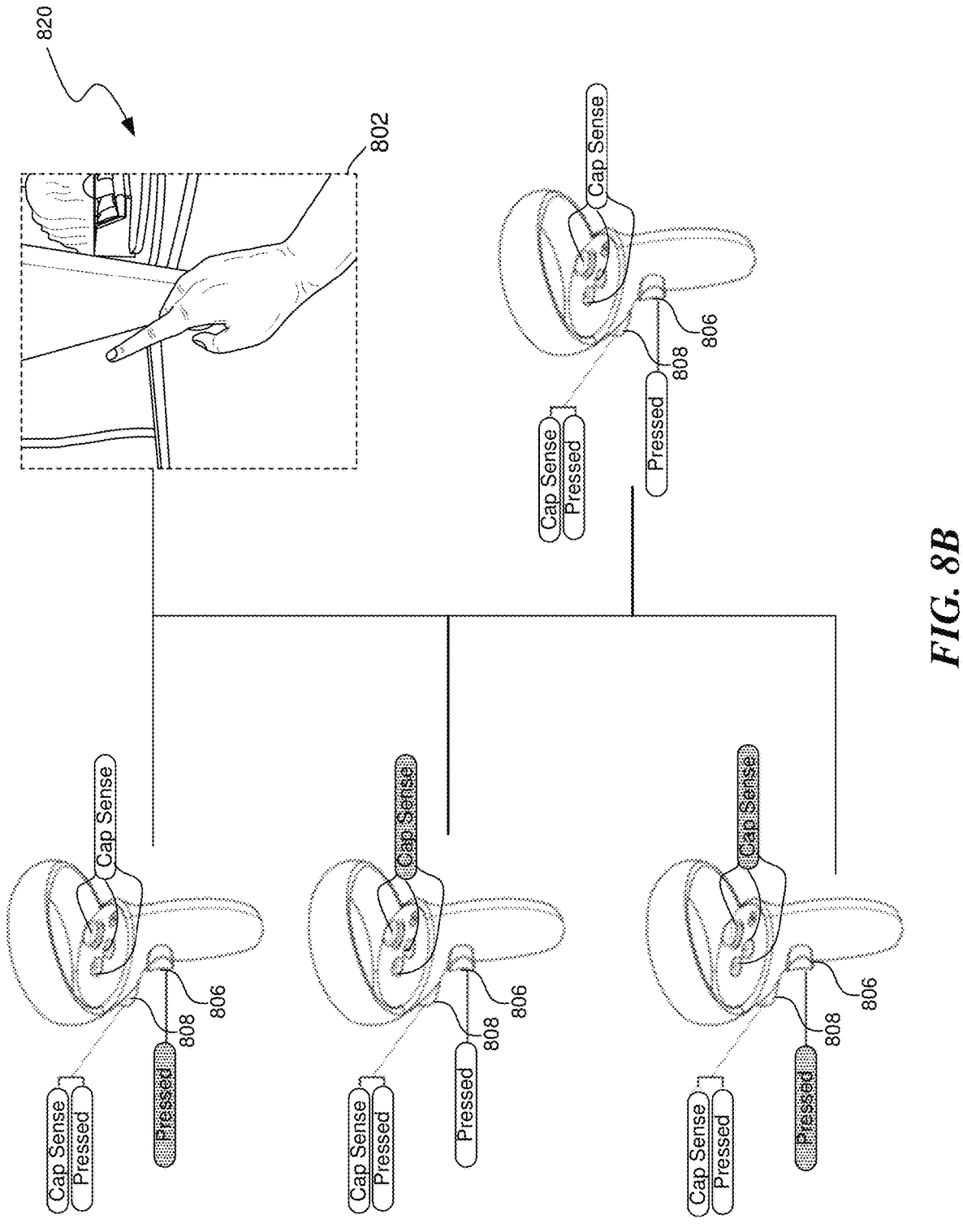

In example 820 of FIG. 8B, hand representation 802 is in a poke/press (i.e., index finger selection) pose, in response to index finger button 808 not detecting capacitance of a finger touching it (as shown by the index finger button 808 not having a shaded "cap sense" status, no matter what other button statuses are present).

Figure 8C:
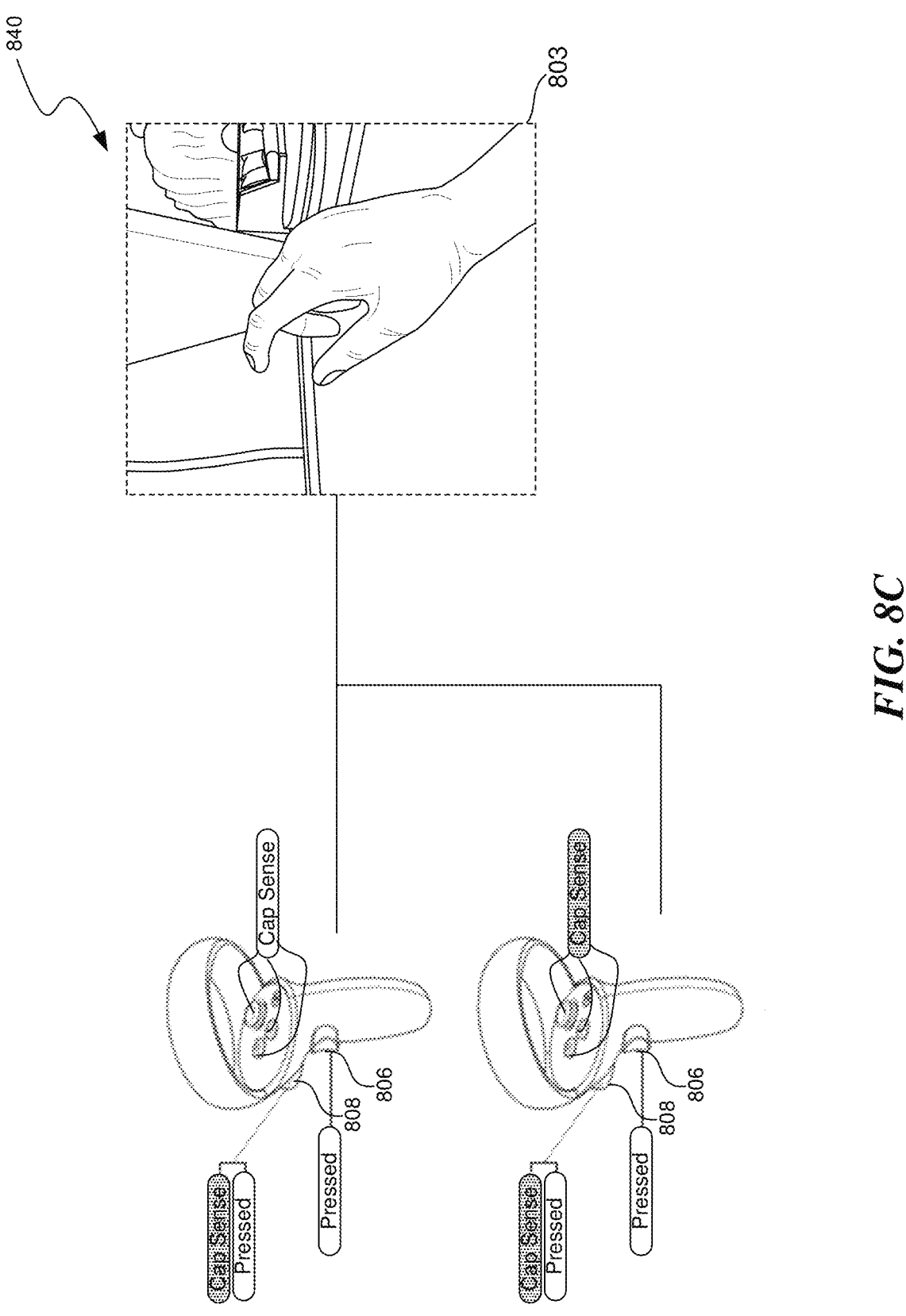

In example 840 of FIG. 8C, hand representation 803 is in an open pinch pose, in response to index finger button 808 detecting capacitance of a finger touching it (as shown by the index finger button 808 having a shaded "cap sense" status while grip button 806 is not being pressed (as shown by the grip button 806 not having a shaded "pressed" status—e.g., when the user's middle finger is not pressing the grip button 806).

Figure 8D:
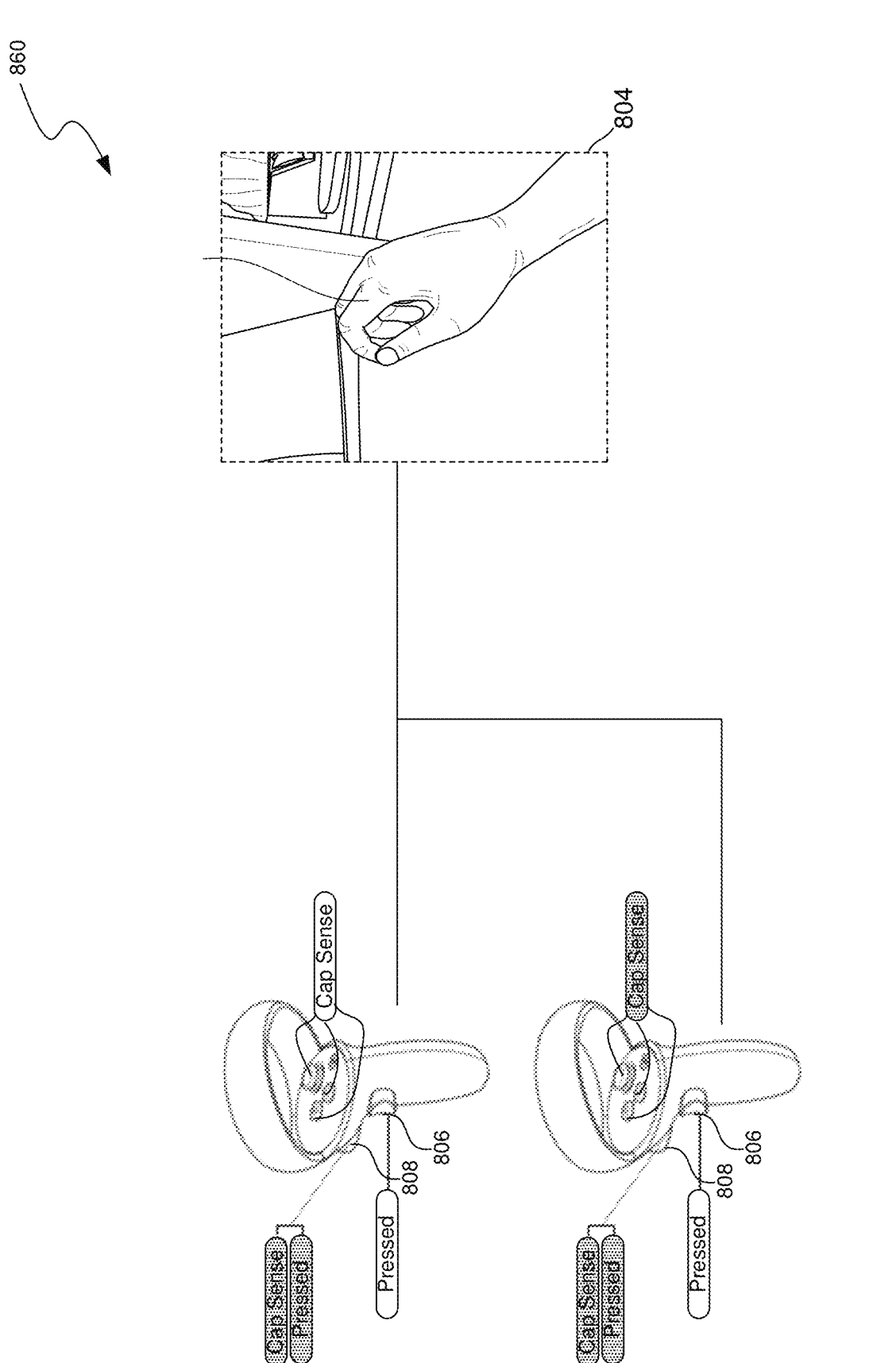

In example 860 of FIG. 8D, hand representation 804 is in a closed pinch pose, in response to index finger button 808 being pressed (which also necessitates capacitance of a finger touching it), as shown by the index finger button 808 having both a shaded "pressed" and "cap sense" status while grip button 806 is not being pressed (as shown by the grip button 806 not having a shaded "pressed" status—e.g., when the user's middle finger is not pressing the grip button 806).

Figure 9:
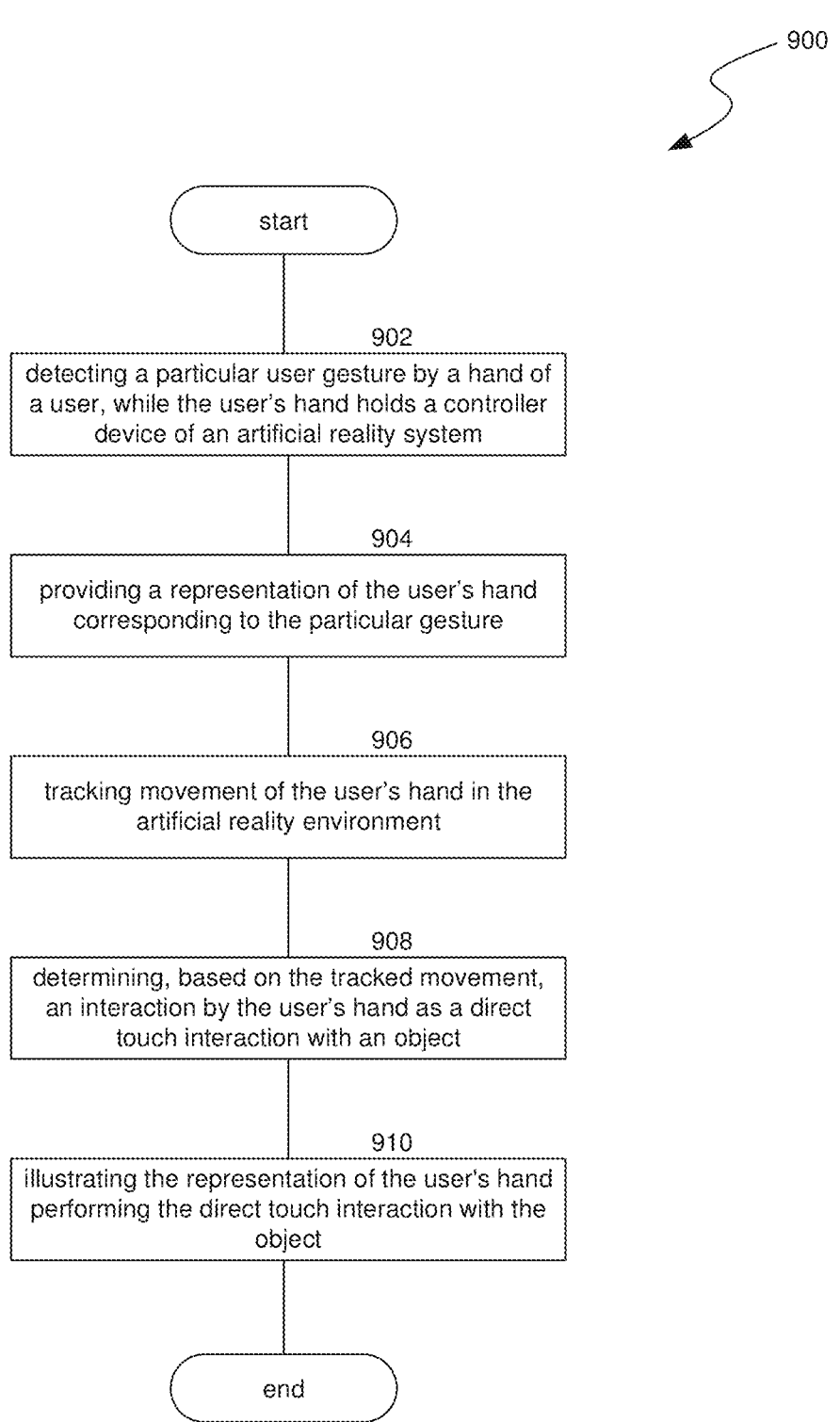
FIG. 9 is a flow diagram illustrating a process used in some implementations of the present technology for providing direct touch interaction with while a user holds a controller.

FIG. 9 is a flow diagram illustrating a process 900 used in some implementations of the present technology for providing direct touch interaction with while a user holds a controller. In various implementations, process 900 can be performed on an artificial reality device or parts of process 900 can be performed by a remote system (e.g., server, local compute unit, etc.) that supports an artificial reality device. In some cases, process 900 can be performed in response to an artificial reality device starting up or when the artificial reality device detects the user is interacting with a controller.

At block 902, process 900 can detect a particular user gesture by a hand of a user, while the user's holds a controller device of an artificial reality device. In various implementations, this can be performed where the detecting is done by A) determining a capacitance sensor change in a button of the controller B) detecting an IR sensor change for a button of the controller or C) applying computer vision, to one or more captured images depicting at least part of the hand of the user, to determine that the hand has made the particular user gesture. With capacitance or IR sensors. e.g., embedded within a controller button, the device can discern subtle changes in capacitance or whether a button is covered, which can indicate whether the user is touching a button and, if not, can be inferred as the user performing the particular gesture. With computer vision, process 900 can analyze captured images of the user's hand and employs sophisticated algorithms (e.g., machine learning models trained to recognize certain gestures) to interpret and recognize the particular gesture. In some cases, the system's determination of the user interaction with the controller's button (e.g., which buttons are being not touch, touched, or pressed), can be applied to a predetermined mapping to gestures to determine the particular gesture. Examples of the particular gesture can be one of one or more fingers pointing, the user's thumb and one or more fingers making a pinch gesture, or the user making first gesture.

In some cases, process 900 can detect an angle of the user's finger in relation to the user's hand (e.g., using the computer vision approach, based on a wearable device such as a glove, ring, or wristband, as discussed above). As discussed below, this angle can be used to show a representation of the user's finger at that same angle in the artificial reality environment to the representation of the user's hand. In other cases, providing the representation of the user's hand, when the gesture is detected, includes displaying the representation of the finger at a predetermined angle to the representation of the user's hand.

At block 904, process 900 can provide, e.g., by the artificial reality device and in an artificial reality environment, a representation of the user's hand corresponding to the particular gesture. In various implementations, the representation of the user's hand can be shown alone or with it holding a representation of the controller. In some additional cases, process 900 can, in response to detecting that the user's hand or controller is within a threshold distance of an object configured for direct touch interaction, hide the representation of the controller.

At block 906, process 900 can track movement of the user's hand in the artificial reality environment. In various implementations, process 900 can accomplish this e.g., by directly tracking the user's hand (e.g., using computer vision to recognize the user's hand and its relational movement in the environment) or alternatively or in combination with tracking a device associated with the user's hand such as the controller (e.g., interpreting movement of the user's hand based on tracked movement of the controller) or another tracked device or device with movement telemetry such as a wrist or ring wearable.

At block 908, process 900 can determine, based on the tracked movement and while the user's hand continues to hold the controller device, an interaction by the user's hand as a direct touch interaction with an object. The interaction can be, for example, contact between the hand representation and the object. The object can be, for example, a virtual object, which can include a stand-alone virtual object or an augment to a real object, such as a user interface.

At block 910, process 900 can illustrate, in the artificial reality environment, the representation of the user's hand performing the direct touch interaction with the object. For example, process 900 can show a virtual object moving as a result of the representation of the user's hand touching it, a UI (e.g., button, dial, slider, etc.) being actuated, a touched object being selected, etc.

The disclosed technology allows the user to interact with a UI that is close (e.g., via pointing/touching) while still holding the controller. The technology can also fade out the controller in the representation, so only see an avatar hand when the index finger is used for pointing/touching. The technology further enables use of a preferred input method (e.g., controller or hand) depending on the context. The technology provides seamless switching between controller and hand. The technology can utilize digital tracking of the controller, which in some examples works better, is more accurate, than tracking of just the hand. Haptics in the controller enables feedback to the user when using finger to touch (assisted touch) as opposed to using pure hands for interaction. The technology further provides the ability to track hand gestures while holding the controller. Gestures can include tapping, grabbing, scrolling, pinching, etc. The technology can use controller sensors to infer hand gestures (logical hands) based on where on the controller the user is touching. Buttons on controller can have sensors (such as capacitance sensors) so the technology can determine when a finger is lifted. The technology can also determine if user is squeezing the controller/pressing buttons. The technology can change hand visualization (e.g., of the avatar) to reflect a hand gesture to show an intended action, which can be different than actual user's hand position. The technology can infer gestures based on mappings of inputs/sensed grips on controller to expected corresponding gestures.

The technology can also use cameras/vision to determine hand gesture when gripping controller in place of or in addition to the touch sensing. In some implementations, this can be done by receiving input from a camera, that can be located on the controller or on the head mounted device, and that captures images of the user's hand and determines, based on the images, a posture such as a 3D model of the hand, a skeletal representation of the hand, relative coordinates or distances for specified points on a hand (e.g., various joints and fingertips), etc. In some Implementations, hand postures can be monitored based on other input in addition to cameras and/or sensing touch on the controller, such as from sensors in a wearable glove or bracelet, sonar or ultrasound sensors, etc. This multimodal tracking is helpful, for example, when switching between using a controller and using pure hands for interaction.

The technology can also use a stylus as a controller with capacitive sensing to determine which portion of the stylus the user is touching or any other type of physical input device (e.g., keyboard, mouse, etc.).

The technology can transition visualizations from when the avatar is a hand holding a controller to a pure hand not holding a controller is based on distance of the hand/controller from UI elements. The technology can transition to pure hand when distance is reduced below a threshold. The technology can have a mid-transition to "ghost" opaque controller before transitioning to pure hand. The technology can show the controller with a finger off before fading away controller to pure hand.

The technology can also detect controller rotation and use the rotation as another trigger for determining direct hand input.

A capacitive sensor can be included in one or more buttons of the controller and can also be on the grip. The technology can also track how far finger is lifted off of button (e.g., using a camera on the HMD or controller).

The technology can detect hand position or infer gestures based on buttons being touched or augmented or replaced by computer vision system. Any sensors can be used to infer user gestures, such as based on motions as determined by IMU.

When close to the UI and/or the use's finger is lifted off the controller, the system can use the finger touching for direct interaction with the UI. When further from the UI and/or the use's finger is not lifted off the controller the technology can use ray casting for inputs. When a use's hand is near a UI they can directly interact with it using their hands. If the use's hand is, for example, >15 cm from the UI that their hand is aiming towards the UI, the technology can show a line or ray from the use's hand to the UI. The user can pinch to make a selection like they normally would with hands. As long as the user is interacting using the ray, the technology may not turn the ray off and/or switch to pure hands mode until the ray is disabled or no longer being userd for interacting with an object or when the hand is within, for example, 8 cm of the UI to avoid constant switching. The technology can also look at heuristics like the trajectory of the hand and if it is moving closer to the UI. The distance used can be far enough where the system does not acciden- tally show the user a ray when not intended but also close enough to allow the user to hold their hand in a restful state to interact.

Reference in this specification to ""implementation"" (e.g., ""some implementations"" ""various implementa- tions"" "one implementation," "an implementation," etc.) means that a particular feature, structure, or characteristic described in connection with the implementation is included in at least one implementation of the disclosure. The appear- ances of these phrases in various places in the specification are not necessarily all referring to the same implementation, nor are separate alternative implementations or mutually exclusive of other implementations. Moreover, various fea- tures are described which may be exhibited by some imple- mentations and not by others. Similarly, various require- ments are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a thresh- old means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase ""selecting a fast connection"" can be understood to mean selecting a connection that has a value assigned corresponding to its connection speed that is above a thresh- old.

As used herein, the word ""o"" refers to any possible permutation of a set of items. For example, the phrase ""A, B, or"" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in lan- guage specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and imple- mentations. The specific features and acts described above are disclosed as example forms of implementing the claims that follow. Accordingly, the embodiments and implemen- tations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this applica- tion, then this application shall control.

We claim:

1. A method for providing direct touch interaction with virtual objects while a user holds a controller, the method comprising:

detecting a particular user gesture by a hand of a user, while the user's hand holds a controller device of an artificial reality system;

providing, by the artificial reality system and in an arti- ficial reality environment, a representation of the user's hand corresponding to the particular gesture;

tracking movement of a portion of the user's hand, not in contact with the controller device, in the artificial reality environment;

determining, based on the tracked movement of the por- tion of the user's hand not in contact with the controller device, and while the user's hand continues to hold the controller device, an interaction intention by the por- tion of the user's hand not in contact with the controller device, as a direct touch interaction with a virtual object; and illustrating, in the artificial reality environment, the rep- resentation of the portion of the user's hand not in contact with the controller device performing the direct touch interaction with the virtual object.

2. The method of claim 1, wherein the detecting the particular user gesture is based on detecting a capacitance or infrared (IR) sensor change in a button of the controller.

3. The method of claim 1, wherein the detecting the particular user gesture is performed by applying computer vision, to one or more captured images depicting at least part of the hand of the user, to determine that the hand has made the particular user gesture.

4. The method of claim 1, wherein the detecting the particular user gesture includes mapping a set of detected button states, based on determined user interaction or lack of interaction with one or more controller buttons, to the particular user gesture.

5. The method of claim 4, wherein the user gesture is one of:

one or more fingers pointing; or the user's thumb and one or more fingers making a pinch gesture.

6. The method of claim 1, wherein the detecting the particular user gesture includes detecting an angle of the user's finger in relation to the user's hand; and wherein the providing the representation of the user's hand includes showing the representation of the user's hand with a finger at the detected angle.

7. The method of claim 1, wherein the detecting the particular user gesture includes detecting that a user is not touching a particular button of the controller; and wherein the providing the representation of the user's hand includes displaying a finger at a predetermined angle to the representation of the user's hand.

8. The method of claim 1, wherein the providing the representation of the user's hand includes providing a rep- resentation of the controller as being held by the represen- tation of the user's hand.

9. The method of claim 8 further comprising, in response to detecting that the tracked movement moved the portion of the user's hand within a threshold distance of an object configured for direct touch interaction, hiding the representation of the controller.

10. The method of claim 1, wherein the tracking movement of the portion of the user's hand is performed by interpreting movement of the portion of the user's hand based on tracked movement of the controller.

11. A computer-readable storage medium storing instructions that, when executed by a computing system, cause the computing system to perform a process for providing direct touch interaction with virtual objects while a user holds a controller, the process comprising:

detecting a particular user gesture by a hand of a user, while the user's hand holds a controller device of an artificial reality system;

providing, by the artificial reality system and in an artificial reality environment, a representation of the user's hand corresponding to the particular gesture;

tracking movement of a portion of the user's hand, not in contact with the controller device, in the artificial reality environment;

determining, based on the tracked movement of the portion of the user's hand not in contact with the controller device, and while the user's hand continues to hold the controller device, an interaction intention by the portion of the user's hand not in contact with the controller device, as a direct touch interaction with a virtual object; and illustrating, in the artificial reality environment, the representation of the portion of the user's hand not in contact with the controller device performing the direct touch interaction with the virtual object.

12. The computer-readable storage medium of claim 11, wherein the detecting the particular user gesture is based on detecting a capacitance or infrared (IR) sensor change in a button of the controller.

13. The computer-readable storage medium of claim 11, wherein the detecting the particular user gesture is performed by applying computer vision, to one or more captured images depicting at least part of the hand of the user, to determine that the hand has made the particular user gesture.

14. The computer-readable storage medium of claim 11, wherein the detecting the particular user gesture includes mapping a set of detected button states, based on determined user interaction or lack of interaction with one or more controller buttons, to the particular user gesture.

15. The computer-readable storage medium of claim 11, wherein the detecting the particular user gesture includes detecting an angle of the user's finger in relation to the user's hand; and wherein the providing the representation of the user's hand includes showing the representation of the user's hand with a finger at the detected angle.

16. The computer-readable storage medium of claim 11, wherein the detecting the particular user gesture includes detecting that a user is not touching a particular button of the controller; and wherein the providing the representation of the user's hand includes displaying a finger at a predetermined angle to the representation of the user's hand.

17. A computing system for providing direct touch interaction with virtual objects while a user holds a controller, the computing system comprising:

one or more processors; and one or more memories storing instructions that, when executed by the one or more processors, cause the computing system to perform a process comprising:

detecting a particular user gesture by a hand of a user, while the user's hand holds a controller device of an artificial reality system;

providing, by the artificial reality system and in an artificial reality environment, a representation of the user's hand corresponding to the particular gesture;

tracking movement of a portion of the user's hand, not in contact with the controller device, in the artificial reality environment;

determining, based on the tracked movement of the portion of the user's hand not in contact with the controller device, and while the user's hand continues to hold the controller device, an interaction intention by the portion of the user's hand not in contact with the controller device, as a direct touch interaction with a virtual object; and illustrating, in the artificial reality environment, the representation of the portion of the user's hand not in contact with the controller device performing the direct touch interaction with the virtual object.

18. The computing system of claim 17, wherein the providing the representation of the user's hand includes providing a representation of the controller as being held by the representation of the user's hand.

19. The computing system of claim 18, wherein the process further comprises, in response to detecting that the tracked movement moved the portion of the user's hand within a threshold distance of an object configured for direct touch interaction, hiding the representation of the controller.

20. The computing system of claim 17, wherein the tracking movement of the portion of the user's hand is performed by interpreting movement of the portion of the user's hand based on tracked movement of the controller.

\* \* \* \* \*